May 30, 1939. J. M. SIMPSON ET AL 2,160,091
TRANSMISSION SYNCHRONIZER
Filed Oct. 11, 1937
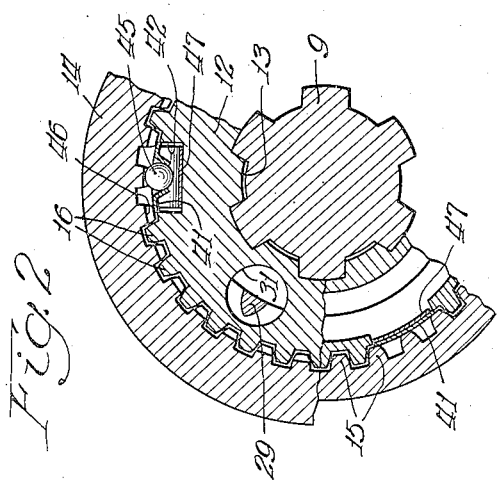
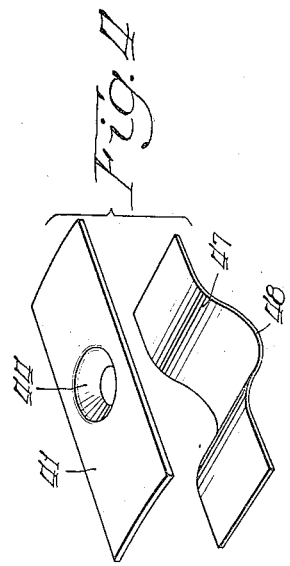
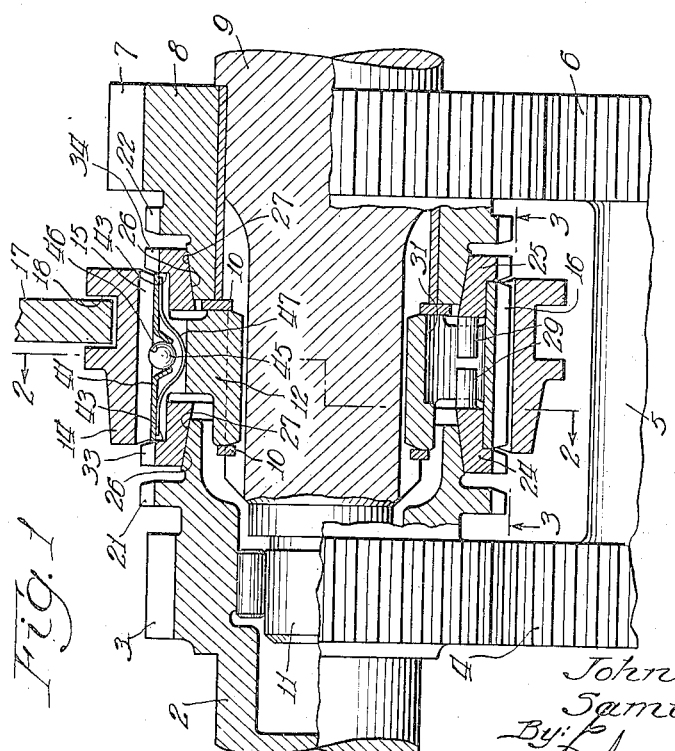
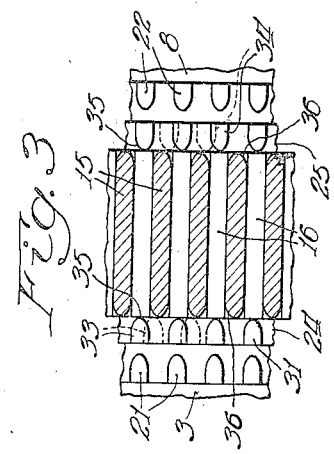
Inventors:
John M. Simpson and
Samuel O. White.
By Edward C. Gritzbough
Atty.

Patented May 30, 1939

2,160,091

UNITED STATES PATENT OFFICE 2,160,091

TRANSMISSION SYNCHRONIZER

John M. Simpson and Samuel O. White, Muncie, Ind., assignors to Borg-Warner Corporation, Chicago, Ill., a corporation of Illinois Application October 11, 1937, Serial No. 168,401

13 Claims. (Cl. 192—53)

This invention relates to improvements in transmission synchronizers such as employed in change-speed transmissions of motor vehicles to bring driving and driven power transmitting elements to the same speed before drivingly interlocking the elements through positive clutch means. The invention is particularly directed to transmission synchronizers of the so-called "blocker" type having means to prevent engagement of the positive drive clutch prior to the time that synchronization takes place.

It is the principal object of our invention to provide an improved transmission synchronizer of the blocker type, wherein the mechanism for transmitting thrust from the positive moving jaw clutch element to the synchronizer-blocker elements to initiate blocking and synchronizing function, is so constructed and arranged as to provide uniform and efficient operation throughout the useful life of the transmission with which the parts are associated, and wherein such mechanism is not subject to deficiency in performance through normal wear.

A further object of our invention is to provide an improved transmission synchronizer of the blocker type which may be manufactured at relatively small cost, and wherein the mechanism for initiating operation of the synchronizer-blocker elements may be formed of stampings by simple manufacturing process.

Other objects, the advantages and uses of the invention will become apparent after reading the following specification and claims, and after consideration of the drawing forming a part of this specification, wherein:

Fig. 1 is a vertical sectional view through a transmission synchronizer constructed in accordance with our invention;

Fig. 2 is a sectional view along the line 2—2 of Fig. 1;

Fig. 3 is a sectional view taken along the line 3—3 of Fig. 1; and

Fig. 4 is a fragmentary view of the cooperating stamped metal parts of a part of the mechanism illustrated in Fig. 1.

We have selected for illustration herein an embodiment of our invention as applied to certain of the torque-transmitting members of a conventional change-speed transmission of the character used in motor vehicles, and such as illustrated in U. S. Letters Patent No. 1,872,566.

With reference to Figs. 1 to 3 hereof, such transmission may include a drive shaft 2 having formed thereon an external gear 3 engageable with a gear 4 carried on the transmission countershaft 5. A second gear 6 also carried on the countershaft 5 may mesh with the external teeth 7 of the transmission second speed gear 8, the gear 8 being rotatably mounted upon the transmission driven shaft 9 but fixed against axial movement relative thereto. The shafts 2 and 9 being coaxial, one end 11 of the shaft 9 may be piloted in the adjacent end of the shaft 2, as shown.

A clutch supporting member 12 is mounted upon the shaft 9 between the gear 3 and gear 8 and is keyed thereto, as indicated at 13. The member 12 is also fixed against axial movement relative to the shaft 9 by thrust washers 10 and serves as a support for the movable element 14 of a positive jaw clutch. Except for practical difficulties of construction, the member 12 could be formed integral with the shaft 9. The movable jaw clutch element 14 may take the form of a sleeve having internal gear-like clutch teeth 15 slidably engaged with a complementary externally toothed portion 16 of the member 12 (see Fig. 2). A shift fork 17 received in an annular groove 18 formed in the outer wall of the clutch element 14 serves as a means axially to shift the member 14 selectively in the direction of the gear 3 or gear 8 as desired. Positive jaw clutch teeth conforming in contour with the teeth 16 upon the member 12 and in end to end register therewith are formed upon each of the gears 3 and 8, as illustrated at 21 and 22 respectively. Movement, therefore, of the clutch element 14 to the left, as viewed in Fig. 1, will serve positively to drivingly interconnect the drive member 2 with the shaft 9, and, in like manner, movement of the clutch element 14 to the right, will provide a direct drive connection between the gear 8 and the shaft 9. Such engagement of the positive jaw clutch may not take place, however, without clashing of the parts and injury thereto, unless the relatively fixed clutch part to which the movable clutch element 14 is drivingly engaged, is rotating at the same speed as the element 14 and is in synchronism therewith.

In order to establish synchronism between the movable jaw clutch element 14 turning with the shaft 9, and the relatively fixed parts 21 or 22, as desired, we provide a friction clutch synchronizer mechanism between the support member 12 and the gears 3 and 8. Such mechanism, in the construction illustrated, may comprise a pair of forged bronze rings 24 and 25, respectively, one located at each side of the support member 12 and each having a conical friction surface 26 engageable with a complementary friction surface 27 formed on an adjacent portion of the gear 3 and gear 8, respectively.

The synchronizer rings 24 and 25 may be drivingly connected to the support 12 as by means of integral lugs 29 formed on that side of each ring facing the support 12, the lugs extending into openings 31 located transversely through the member 12. The openings 31 may be of such diameter relative to the width of the lugs 29 as to permit a limited relative rotation between each ring and the member 12 an amount equal to, but not greater than, the width of the teeth formed on the movable positive clutch element 14. Except for the lugs 29 which limit relative rotation of the synchronizer ring, with respect to the member 12 and its supporting shaft 9, each of the rings is free to float between the member 12 and the adjacent friction clutch surfaces 26 of the gears 3 and 8 respectively.

The rings 24 and 25 each possess, in addition to the function of a friction clutch synchronizer element, the function of a blocker mechanism for preventing engagement of the jaws of the positive clutch 14—21 and 14—22, prior to the time that synchronism of the positive jaw clutch parts takes place. This function of the rings 24 and 25 may be carried out by the provision of radially extending external blocker teeth 33 and 34 formed on the outer peripheries of the rings 24 and 25, respectively, and conforming in contour to the clutch teeth 21 and 22 on the gears 3 and 8, respectively. The blocker teeth 33 and 34 may be further formed with those ends thereof facing the slidable clutch member 14 chamfered as indicated at 35 (see Fig. 3). The adjacent ends of the teeth 15 upon the clutch element 14 may likewise be chamfered as indicated at 36, so that movement of the jaw member 14 in the direction of the relatively fixed jaw teeth 21 or 22 may cause the registering chamfered surfaces 35 and 36 of the blocker teeth and jaw teeth 15 to contact along surfaces disposed angularly with respect to the axis of rotation of the clutch parts at such times as when the teeth 33 or 34 are not in direct end-to-end register with the teeth 16 upon the clutch support member 12. This condition of the parts may exist whenever one of the two torque-transmitting members to be interconnected, such as the shaft 9 to the gear 3, or gear 8, is rotating at a speed different from the speed of the remaining member, hence causing the synchronizer-blocker ring to be moved toward one or the other of its limits of rotation relative to the support 12. As the parts approach synchronism, there will be a relative reversal of rotation, thus causing the blocker teeth for a moment to register directly with the teeth 16 on the support 12, which position is indicated in full lines of Fig. 3, and at such moment, the clutch element 14 will be free to continue in its movement into engagement with the relatively fixed jaw clutch teeth toward which it has been initially moved. This blocking function of the synchronizer-blocker rings will, of course, take place only when the rings are urged toward their adjacent friction clutch complement so as to bring about frictional driving engagement between the synchronizer-blocker ring and the torque member with which the ring is engaged frictionally.

Means for causing the synchronizer-blocker ring to move first to block positive jaw clutch engagement, and thereafter synchronize the parts to be coupled, upon axial movement of the positive clutch element 14, may comprise a plurality of relatively light weight and low inertia thrust members 41 spaced at equal distances apart from one another about the circumference of the support member 12, and disposed parallel to the axis thereof. Each of the thrust members 41 may be constructed of stamped sheet metal and each may be located in a channel 42 formed transversely across the peripheral surface of the tooth portion of the support member 12, and each of such length so that the opposed ends thereof lie just free of the adjacent and radially extending surfaces 43 of that portion of the rings 24 and 25 upon which the blocker teeth 33 and 34 respectively are disposed.

Each of the thrust members 41 (see Fig. 4) may be formed at its mid-portions with an outwardly facing conical depression 44 within which there is seated a steel ball 45 adapted to fall within an annular groove 46 formed on the inner toothed wall of the movable positive jaw clutch member 14 when the thrust member 41 is urged radially outwardly, as by a spring 47 located between the thrust member and the bottom wall of the channel 42, as indicated in Fig. 1. The spring 47 may be of the bowed band-spring type having its central bowed portion 48 contacting with the bottom wall of the channel 42 and its radially outward ends contacting under radial pressure with the under side of the thrust member 41 at its outer end portions.

The thrust members 41, steel balls 45, the groove 46 and springs 47 cooperate to provide a multiple break-away connection between the shiftable positive jaw clutch member 14 and the thrust members 41 so that longitudinal movement of the jaw clutch member 14 to the left or right as viewed in Fig. 1, will cause the thrust members 41 to be carried therewith until continued longitudinal movement of the jaw clutch member 14 under force sufficient to cause the spring 47 to yield, permits the jaw clutch member 14 to break-away from its operative connection with the thrust members.

It will readily be apparent that, with the parts arranged as described, initial movement of the positive clutch element 14 toward either of its complementary clutch portions 21 or 22 will cause the thrust members 41 to move therewith and to bear against and to urge one of the synchronizer-blocker rings 24 or 25 toward its friction clutch complement depending upon which direction the positive clutch member 14 is urged. This initial axial movement of the synchronizer-blocker ring will cause the ring, when engaged with its friction clutch complement, to turn with the part to which it is frictionally engaged and thus cause a relative rotation between the ring and the support member 12 in the direction of the movement of the part which is rotating at a superior speed, thus to cause the chamfered surfaces 35 and 36 of the blocker teeth and the positive jaw clutch teeth 15 to move into blocking register, as indicated in dotted lines in Fig. 3. Continued movement of the positive jaw clutch element 14 will thereupon be resisted by the chamfered surfaces of the blocker teeth even though considerable force is applied to the positive clutch element 14, tending to cause it to move into engagement with its desired positive jaw clutch complement. This resistance to positive clutch engagement will exist until the part to be drivingly interlocked to the positive jaw clutch, arrives at a synchronous speed therewith at which point there will be a relative reversal of movement causing the blocker-synchronizer ring to move toward the position indicated in full lines of Fig. 3. When such position is assumed, there will be no further resistance to clutch movement of the part 14 and it may, therefore, be urged onwardly into positive clutch engagement with the teeth 21 or 22, the yielding connection between the thrust members 41 and annular grooved portion 46 of the clutch element 14 breaking away under the force applied to move the clutch element 14.

From the foregoing it will be apparent that we have provided an improved transmission synchronizer wherein the mechanism for transmitting thrust from the movable and positive clutch jaw elements 14 to either of the synchronizer-blocker rings, is so constructed and arranged as to permit of delicate but permanent adjustment of the parts so that the amount of force applied to the jaw clutch member 14 to cause a breakaway between that member and the thrust members 41 may be accurately predetermined and maintained throughout the useful life of the transmission synchronizer. This feature is largely due to the use of the balls interposed between the thrust members 41 and the grooved portion 46 of the jaw clutch, and to the provision of a steel spring 47 susceptible of consistency of operative function.

The mechanism above described is of such simple construction as readily to enable its manufacture at relatively low cost, an added feature over the uniformity in operation thereof.

We claim:

1. A transmission synchronizer comprising, a pair of torque transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, a plurality of relatively lightweight sheet metal thrust members each adapted to bear at one end upon said synchronizer element and located against lateral displacement in grooves formed on said one member, steel balls located in sockets formed on the radially outwardly facing walls of said thrust members so as to receive radial thrust therefrom and adapted to be received in an annular groove formed on the inner and adjacent wall of said movable jaw clutch element, and spring means interposed between said thrust members and the bottom wall of said groove whereby said thrust members with their steel balls may be urged radially outwardly.

2. A transmission synchronizer as defined in claim 1 wherein said spring means comprises bowed band-springs having radially outwardly bowed end portions contacting the opposite end portions of said thrust members and the convex sides of the bowed mid-portions thereof contacting the bottom wall of said grooves.

3. A transmission synchronizer comprising, a pair of torque transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, a plurality of thin, flat relatively lightweight thrust members each adapted to bear at one end upon said synchronizer element and located against lateral displacement in grooves formed on said one member, balls located in sockets formed on the radially outwardly facing walls of said thrust members so as to receive radial thrust therefrom and adapted to be received in a depression formed on the inner and adjacent wall of said movable jaw clutch element, and spring means interposed between said thrust members and said one member, whereby said thrust members with their balls may be urged radially outwardly.

4. A transmission synchronizer comprising, a pair of torque transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, a plurality of relatively lightweight thrust members each adapted to bear at one end upon said synchronizer element and located against lateral displacement by means formed on said one member, balls located in sockets formed in said thrust members so as to receive radial thrust therefrom and adapted to be received in a depression formed on the inner and adjacent wall of said movable jaw clutch element, and spring means interposed between said thrust members and said one torque-transmitting member, whereby yieldingly to maintain said balls in the depression of said jaw clutch element.

5. In a transmission synchronizer of the character described, a rotatably mounted and axially fixed torque-transmitting member, an axially movable clutch element encircling said member and drivingly connected thereto, a plurality of sheet metal thrust members free to slide axially relative to said torque member and adapted to rotate therewith, said axially movable clutch element having an indented portion intermediate its length on the inner wall thereof, balls, one for each of said thrust members carried and supported upon said thrust members so as to receive radial thrust therefrom and engageable with the indented portion of said movable clutch element, and spring means urging said thrust members radially outwardly of the axis of said torque member toward the inner wall of said axially movable clutch element, whereby said thrust members are caused collectively to move axially of said torque-transmitting member upon axial movement of said movable clutch element until resisted in an amount sufficient to overcome the radial force of said spring means acting upon said steel balls through said thrust members to permit the balls to break away from said indented portion of said clutch element.

6. The combination defined in claim 5, wherein said thrust members are constructed of relatively light stampings, each having a conical depression in the radially outward face thereof for receiving said steel balls, and wherein said spring means comprise band-springs, one for each of said thrust members.

7. In a transmission synchronizer, having a movable jaw clutch element and a synchronizer ring, a thrust member for transmitting thrust from said movable clutch member to said synchronizer ring, said thrust member having a depression formed on one side thereof, a ball seated in said depression so as to receive radial thrust therefrom and partially receivable within a groove formed on the adjacent wall of said movable clutch member, whereby axial movement of said clutch member may cause axial movement of said thrust member, said thrust member having one end thereof adapted to abut said synchronizer ring, and resilient means urging said thrust member with said ball in the direction of the grooved portion of said clutch member, whereby yieldingly to maintain said ball within the groove of said clutch member.

8. In a transmission synchronizer, having a movable jaw clutch element and a synchronizer ring, a thin, flat thrust member for transmitting thrust from said movable clutch element to said synchronizer ring, said thrust member having a socket, a ball seated in said socket so as to receive radial thrust therefrom and partially receivable within a depression formed on the adjacent wall of said movable clutch element, whereby axial movement of said clutch element may cause axial movement of said thrust member, said thrust member having one end thereof adapted to abut said synchronizer ring, and resilient means urging said ball in the direction of the depression in said clutch element, whereby yieldingly to maintain said ball within said depression.

9. In a transmission synchronizer, having a movable jaw clutch element and a synchronizer ring, a stamped sheet metal thrust member for transmitting thrust from said movable clutch element to said synchronizer ring, said thrust member having a socket, a ball seated in said socket and partially receivable within a depression formed on the adjacent wall of said movable clutch element, whereby axial movement of said clutch element may cause axial movement of said thrust member, said thrust member having one end thereof adapted to abut said synchronizer ring, and a leaf spring having end regions engaging said thrust member so as to urge the same radially outwardly and having a radially inwardly bowed central region partially receiving said ball and socket.

10. In a transmission synchronizer, a thrust means for transmitting thrust from one member to another comprising a thrust member, a ball located against lateral movement in said thrust means and in register with a depression in said one member, said ball being adapted to receive radial thrust from said thrust means, said thrust means having an end thereof in abutting relationship to said other member, and a leaf spring having end regions engaging said thrust means and adapted to transmit radial outwardly directed yielding pressure thereto and having a radially inwardly bowed central region partially receiving said ball.

11. A transmission synchronizer comprising a pair of torque-transmitting members to be synchronized, a movable jaw clutch element drivingly associated with one of said members and movable into engagement with a jaw clutch element carried by the other member, thus to establish a positive drive connection between said members, a synchronizer element drivingly associated with said one member and axially movable into frictional driving engagement with said other member, a thin, flat lightweight thrust member interposed between said movable jaw clutch element and said one torque-transmitting member in a plane at right angles to a radius thereof, said thrust member being arranged to transmit thrust from said movable jaw clutch element to said synchronizer element, and a leaf spring having end regions engaging said thrust member and a radially inwardly bowed central region engaging said one torque-transmitting member, whereby to urge said thrust member radially outwardly into engagement with the interior periphery of said movable jaw clutch element.

12. A transmission synchronizer as defined in claim 11 including a ball located in said thrust member against lateral movement and adapted to receive radially outwardly directed thrust therefrom and to be thereby urged into a depression formed in the interior periphery of said movable jaw clutch element, whereby to provide a yieldable break-away connection between said movable jaw clutch element and said thrust member.

13. A transmission synchronizer as defined in claim 11, wherein said thrust member is of stamped sheet metal and is formed with a radially inwardly extending socket receiving a ball, and adapted to transmit radially outwardly directed thrust to said ball, whereby to urge the same into engagement in a depression formed in the interior periphery of the movable clutch element, said socket and ball being partially received in the space embraced by said inwardly bowed portion of said leaf spring.

JOHN M. SIMPSON.
SAMUEL O. WHITE.